United States Patent [19]

Arioka et al.

[11] Patent Number: 4,758,471

[45] Date of Patent: Jul. 19, 1988

[54] MAGNETIC RECORDING MEDIUM

[75] Inventors: Hiroyuki Arioka; Koji Kobayashi, both of Nagano; Kiyoshi Noguchi, Kanagawa, all of Japan

[73] Assignee: TDK Corporation, Tokyo, Japan

[21] Appl. No.: 877,866

[22] Filed: Jun. 24, 1986

[51] Int. Cl.$^4$ ............................................. G11B 5/702
[52] U.S. Cl. ...................................... 428/336; 427/44; 427/54.1; 427/128; 427/131; 428/522; 428/704; 428/694; 428/695; 428/900
[58] Field of Search ............... 428/695, 694, 900, 336, 428/704, 522, 421; 427/128, 131, 132, 44, 54.1; 360/134–136

[56] References Cited

U.S. PATENT DOCUMENTS

| | | | |
|---|---|---|---|
| 4,368,239 | 1/1983 | Nakajima | 428/900 |
| 4,404,247 | 9/1983 | Dominquez-Burquette | 428/694 |
| 4,522,885 | 6/1985 | Funahashi | 428/695 |
| 4,526,833 | 7/1985 | Burquette | 428/900 |
| 4,526,836 | 7/1985 | Mukai | 428/900 |
| 4,526,837 | 7/1985 | Ohtsuki | 428/900 |
| 4,621,008 | 11/1986 | Takasugi | 428/900 |
| 4,624,892 | 11/1986 | Ishizaki | 428/900 |
| 4,645,703 | 2/1987 | Suzuki | 427/131 |
| 4,666,754 | 5/1987 | Arioka | 427/131 |
| 4,677,023 | 6/1987 | Ishizaki | 428/900 |
| 4,701,375 | 10/1987 | Nishimatsu | 428/695 |

FOREIGN PATENT DOCUMENTS

| | | | |
|---|---|---|---|
| 39-25246 | 9/1954 | Japan . | |
| 57-29769 | 6/1982 | Japan . | |
| 1113129 | 5/1986 | Japan | 428/694 |

Primary Examiner—Ellis P Robinson
Attorney, Agent, or Firm—Oblon, Fisher, Spivak McClelland & Maier

[57] ABSTRACT

A magnetic recording medium exhibiting improved running stability and durability is obtained by covering a magnetic layer of ferromagnetic metal thin film with a topcoat layer comprising at least one fatty acid ester having a melting point of from −20° C. to 30° C. and at least one compound containing a group having a radiation sensitive unsaturated double bond and a group having a fluorine substituted alkyl group.

8 Claims, No Drawings

MAGNETIC RECORDING MEDIUM

BACKGROUND OF THE INVENTION

This invention relates to a magnetic recording medium, more particularly, to a magnetic recording medium having a topcoat layer exhibiting improved running stability and durability.

In recent years, magnetic recording media were widely used in various spheres including audio, video, computer, and magnetic disk applications. The advanced magnetic recording media are required to be more compact while it is desired to record the increasing quantity of information therein. There is the strong need for increasing the recording density of magnetic recording media.

To meet such a need, binder free magnetic recording media, particularly those magnetic recording media having a magnetic layer in the form of a ferromagnetic metal thin film are more advantageous than conventional coating type magnetic recording media because the former can be made more thinner because of the absence of binder and has greater saturation magnetization. However, a problem arises when magnetic recording media are moved in sliding contact with a magnetic head as in the operation of recording, reproducing, and erasing magnetic signals. Since the magnetic layer of the binder free magnetic recording media is formed by electroplating, electroless plating, sputtering, vacuum deposition, ion plating or similar techniques without a binder, the magnetic layer is relatively readily abraded away or broken by friction due to the high speed relative motion with the magnetic head. The binder free magnetic recording media have another problem that their magnetic layer is liable to corrosion at the surface. A progress of corrosion reduces the useful properties of magnetic layer such as head contact and abrasion resistance, adversely affecting electromagnetic properties.

There have been proposed a number of means for mitigating impact and friction to the magnetic laYer of magnetic recording media. One method is by applying a lubricant on the surface of magnetic layer (see Japanese Patent Publication No. 39-25246)

Japanese Patent Publication No. 57-29769 proposes to form a lubricating layer (or a backcoat layer) based on a liquid or semi-solid lubricant and an organic binder on the surface of magnetic recording medium opposite to its magnetic layer for the purpose of continuously providing lubrication to the magnetic layer surface. It is described in the publication that the lubricant migrates from the backcoat layer to the adjoining surface of the magnetic layer of the magnetic recording medium wound in a roll form, and the lubricant is thus supplied to the magnetic layer surface, thereby increasing the durability or resistance to mar and peeling of the magnetic layer and accomodating variations in coefficient of dynamic friction However, in the case of the lubricant coating described in Japanese Patent Publication No. 39-25246, lubrication does not last for a sufficient period because the lubricant is removed by a magnetic head and guide pins. Thus no improvements in rust prevention and durability are expectable.

In Japanese Patent Publication No. 57-29769, lubricant is contained in the backcoat layer only without forming a topcoat layer on the surface of the magnetic layer Then the friction between the magnetic layer surface and a magnetic head is still so great as to lead to running troubles. No satisfactory results are obtained with respect to corrosion resistance or rust prevention. If the lubricant in the backcoat layer is transferred to the magnetic layer uncovered with a topcoat layer, magnetic metal films become unstable, causing head clogging, output reduction, and even reproduction of no image. Sometimes, friction resistance is not fully reduced and even the film is abraded away or broken. This is true for most of current magnetic metal films, that is, oxygen-containing metal films although not outstanding when oxygen is not introduced in deposited films (that is, oxygen-free metal films, see Japanese Patent Publication No. 57-29769).

On the basis of the concept of containing lubricant in the backcoat layer, it would readily occur to those skilled in the art to apply lubricant to the topcoat layer. The coating of the topcoat with lubricant temporarily reduces friction, but the effect does not last. The resIting magnetic recording medium has weaknesses in rust prevention, corrosion resistance, and durability.

SUMMARY OF THE INVENTION

An object of the present invention is to provide a new and improved magnetic recording medium of the type having a ferromagnetic metal thin film on a non-magnetic substrate which is improved in runnability and durability by forming a specific topcoat layer on the magnetic thin film.

According to the present invention, there is provided a magnetic recording medium comprising a non-magnetic substrate, a magnetic layer on the substrate, and a topcoat layer on the magnetic layer, wherein the topcoat layer has a composition comprising a fatty acid ester having a melting point of from $-20°$ C. to $30°$ C. and a compound containing a group having a radiation sensitive unsaturated double bond and a group having a fluorine substituted alkyl group.

DETAILED DESCRIPTION OF THE INVENTION

The detailed organization of the present invention will now be described. The magnetic recording medium of the present invention has a magnetic layer on a non-magnetic substrate.

The substrates used in the practice of the present invention are not particularly limited as long as they are non-magnetic. Preferred examples are plastic resin films such as polyesters, polyamides, polyimides, and polypropylene; and inorganic plates such as glass plates and metal plates, e.g., aluminum plates.

The magnetic layer is formed on one major surface of the substate. The magnetic layers may be any continuous thin films of ferromagnetic metals. Examples of the thin film-forming ferromagnetic metal materials include ferromagnetic metals such as iron, cobalt, and nickel, and magnetic alloys such as Fe—Co, Fe—Ni, Co—Ni, Fe—Rh, Fe—Cu, Fe—Au, Co—Cu, Co—Au, Co—Y, Co—La, Co—Pr, Co—P, Co—Gd, Co—Sm, Co—Pt, Ni—Cu, Co—Ni—P, Fe—Co—Nd, Mn—Bi, Mn—Sb, Mn—Al, Fe—Co—Cr, Co—Ni—Cr, etc. Also included are those materials known to form perpendicular magnetizable films, for example, CoCr, CoV, CoNiP, CoP, MnBi, MnAlGe, NdFe, NdCo, CoO, MnSb, MnCuBi, GdFe, GdCo, PtCo, TbCo, TbFeCo, GdFeCo, TbFeO$_3$, GdIG (gadolinium iron garnet), GdTbFe, GdTbFeCoBi, CoFe$_2$O$_4$, etc. The magnetic layers may be formed on the substrate directly or through an undercoat layer by any desired metallizing techniques including vacuum deposition, sputtering, ion plating, and plating processes.

Preferably, the magnetic layers used in the practice of the present invention contain cobalt (Co) as an essential element and at least one element selected from nickel (Ni), chromium (Cr), and oxygen (O) as an optional element. The magnetic layers may preferably consist essentially of Co, Co+Ni, Co+O, or Co+Ni+O. That is, they may consist essentially of Co alone or Co and Ni. When they are formed from cobalt and nickel, the weight ratio of Co/Ni is preferably 1.5 or higher. In addition to Co alone or Co plus Ni, the magnetic layer may contain oxygen (O) atoms with the results of better electromagnetic properties and runnability. Preferably, the atomic ratio of O/Co (when nickel free) or O/(Co+Ni) is up to 0.6 and especially ranges from 0.15 to 0.5.

Better results are obtained when the magnetic layers contain chromium (Cr) in addition to Co, Co+Ni, Co+O, or Co+Ni+O. Electromagnetic properties, output, S/N ratio, and film strength are then improved. Preferably, the weight ratio of Cr/Co (when nickel free) or Cr/(Co+Ni) ranges from 0.001 to 0.1, especially from 0.005 to 0.05.

The magnetic layers may further contain trace amounts of other elements, for example, transition metal elements such as Fe, Mn, V, Zr, Nb, Ta, Mo, W, Ti, Cu, Zn, etc.

The magnetic layers preferably consist of coalesced particles of columnar crystal structure each directed at an angle with respect to a normal to the major surface of the substrate because of better electromagnetic properties. Preferably, the particles of columnar crystal structure are at an angle between 20° and 60° with respect to a normal to the major surface of the substrate. In general, they have a length extending throughout the magnetic layer in its thickness direction and a breadth of the order of 50 to 500 Å. Cobalt and optional elements of Ni and Cr form columnar crystal themselves while oxygen (O) atoms, when added, are present in the form of oxides on the surface of each columnar crystal.

The magnetic layers are generally formed to a thickness of about 0.05 $\mu$m to 0.5 $\mu$m, preferably about 0.1 to about 0.25 $\mu$m.

As previously mentioned, the magnetic layers may be formed on the substrate directly or through an undercoat layer. They are generally formed as a monolithic layer, but may be formed from a plurality of plies with or without an intermediate ply. The most common process for forming the magnetic layers is an oblique evaporation technique. The standard oblique evaporation technique may be employed wherein the minimum incident angle with respect to a normal to the substrate is preferably at least 30°. Well-known evaporation conditions may be employed and any suitable post treatment may be carried out if necessary. One useful post treatment is a post treatment for the introduction of oxygen which may be conducted in various ways.

On the magnetic layer is formed a topcoat layer having a composition comprising a fatty acid ester having a melting point of from −20° C. to 30° C. and a compound containing a group having a radiation sensitive unsaturated double bond and a group having a fluorine substituted alkyl group.

The fatty acid esters contained in the topcoat have a melting point of from −20° C. to 30° C., preferably from −10° C. to 25° C. Esters having a melting point of lower than −20° C. do not well lubricate at elevated temperatures, for example, cause clogging and adhesion to the head at 40° C. Esters having a melting point of higher than 30° C. do not well lubricate at lower temperatures, for example, cause adhesion to a cylinder (head) or squeaky noise at 0° C.

Examples of the fatty acid esters having a melting point in the above-defined range include esters of monobasic fatty acids having 4 to 24 carbon atoms such as capric acid, lauric acid, myristic acid, palmitic acid, stearic acid, and arachic acid with monohydric saturated alcohols having 1 to 12 carbon atoms. Preferred among them are esters of monobasic fatty acids having 6 to 20 carbon atoms with monohydric saturated alcohols, the esters having 7 to 26 carbon atoms in total.

Usually the topcoat layer composition contains individual fatty acid esters, but may contain a mixture of two or more fatty acid esters if desired.

Some illustrative, non-limiting examples of the fatty acid esters having a melting point (mp) of from −20° C. to 30° C. are given below.

E1 Methyl laurate (mp=5.0° C.)
E2 Methyl tridecanate (mp=20.5° C.)
E3 Methyl myristate (mp=18.5° C.)
E4 Methyl pentadecanate (mp=18.5° C.)
E5 Methyl margarate (mp=29.7° C.)
E6 Methyl oleate (mp=19.9° C.)
E7 Methyl ricinolate (mp=−4.5° C.)
E8 Ethyl laurate (mp=−1.8° C.)
E9 Ethyl tridecanate (mp=−4.8° C.)
E10 Ethyl myristate (mp=12.3° C.)
E11 Ethyl pentadecanate (mp=14.0° C.)
E12 Ethyl palmitate (mp=25.0° C.)
E13 Ethyl margarate (mp=25.7° C.)
E14 Dodecyl caproate (mp=−4.6° C.)
E15 Butyl laurate (mp=−4.8° C.)
E16 Heptyl laurate (mp=−2.0° C.)
E17 Dodecyl laurate (mp=21.0° C.)
E18 Butyl myristate (mp=1.0° C.)
E19 Propyl palmitate (mp=20.4° C.)
E20 Butyl palmitate (mp=18.3° C.)
E21 Amyl palmitate (mp=19.4° C.)
E22 Octyl palmitate (mp=22.5° C.)
E23 Decyl palmitate (mp=30.0° C.)
E24 Butyl stearate (mp=27.5° C.)
E25 Amyl stearate (mp=30.0° C.)
E26 Isopropyl myristate (mp=9.0° C.)
E27 Isopropyl palmitate (mp=15.0° C.)
E28 Methyl caprate (mp=−18° C.)
E29 Ethyl caprate (mp=−19.9° C.)
E30 Ethyl undecanate (mp=−14.7° C.)
E31 Undecyl caproate (mp=−10.5° C.)
E32 Heptyl caprate (mp=−10.2° C.)
E33 Octyl caprylate (mp=−15.1° C.)
E34 Butyl caprate (mp=−20.0° C.)

The topcoat layer composition also contains a compound containing a group having a radiation sensitive unsaturated double bond and a group having a fluorine substituted alkyl group.

The preferred groups having a radication sensitive unsaturated double bond are groups having the formula: $CH_2=CR^2—CO—$ wherein $R^2$ is hydrogen atom or an alkyl group.

The preferred fluorine substituted alkyl groups are alkyl groups containing 2 to 20 carbon atoms and having a plurality of hydrogen atoms replaced by fluorine atoms. More preferably, the fluorine substituted alkyl groups are those groups represented by $C_nF_{2n+1}-$ wherein n is an integer having a value from 2 to 20.

The preferred compounds are compounds having the general formula (I):

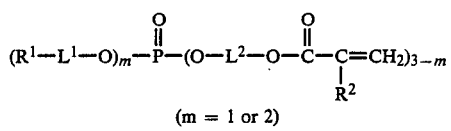

(m = 1 or 2)

and compounds having the general formula (II):

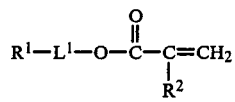

wherein $R^1$ is a fluorine substituted alkyl group, $R^2$ is hydrogen atom or an alkyl group, $L^1$ and $L^2$ are independently selected from divalent bridging groups, and m is equal to 1 or 2.

In formulae (I) and (II), preferred groups represented by $R^1$ are fluorine substituted alkyl groups having 2 to 20 carbon atoms, most preferably groups conforming to $C_nF_{2n+1}-$ wherein n is an integer having a value from 2 to 20, for example, $C_4F_9$, $C_5F_{11}$, $C_6F_{13}$, $C_7F_{15}$, $C_8F_{17}$, $C_9F_{19}$, and $C_{10}F_{21}$.

Preferred divalent bridging groups represented by $L^1$ and $L^2$ are substituted or unsubstituted alkylene groups and arylene groups, groups chemically combined therewith, and groups thereof chemically combined with —O—, —S—, —SO$_2$—, —CO—, —COO—, —OCO—, substituted or unsubstituted —NH—, —SO$_2$NH—, —NHSO$_2$—, —CONH—, and —NHCO—. Most preferred among them are unsubstituted alkylene groups having 1 to 4 carbon atoms. $L^1$ and $L^2$ may be the same or different. $L^1$ and $L^2$ may be further replaced by another substituent such as an alkyl group, aryl group, hydroxyl group, and even $CH_2=CR^2COO-L^1-$ group.

$R^2$ is hydrogen atom or an alkyl group, preferably having 1 to 3 carbon atoms. Preferably $R^2$ is a hydrogen atom and a methyl group.

Some illustrative, non-limiting examples of the compounds of formulae (I) and (II) are given below.

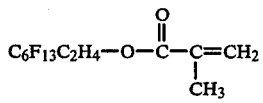

F1

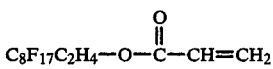

F2

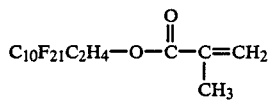

F3

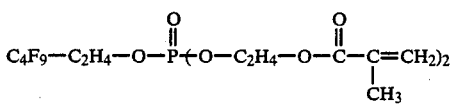

F4

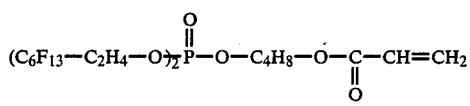

F5

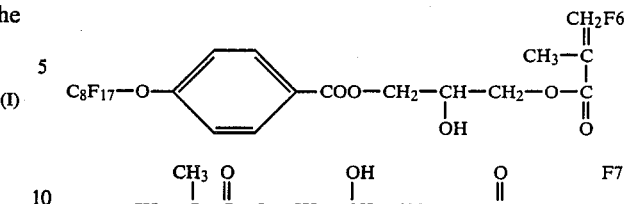

F6

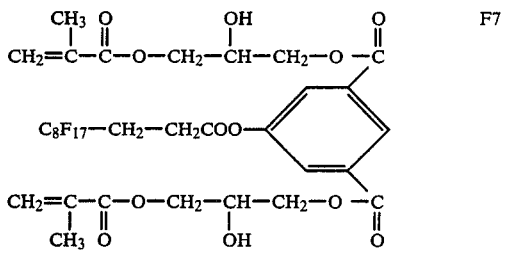

F7

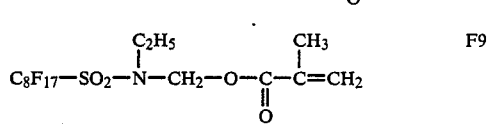

F8

$$C_8F_{17}-SO_2-N(C_2H_5)-CH_2-O-\underset{\underset{O}{\|}}{C}(CH_3)=CH_2$$

F9

These compounds may be readily prepared by a well-known method.

For instance, compounds of formulae (I) and (II) wherein $R^1$ is $C_nF_{2n+1}-$ may be prepared by reacting a halide compound having such a fluorocarbon group, for example, $C_8F_{17}-C_2H_4I$ with water to form a corresponding alcohol $C_8F_{17}-C_2H_4-OH$. The alcohol is then condensed with an unsaturated acid, for example, acrylic acid in the presence of a strong acid, yielding the desired compound, for example,

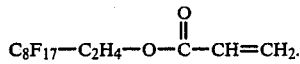

The compounds of formulae (I) and (II) may be individually used or contained in admixture of two or more. In either case, the total amount of the compounds of formulae (I) and (II) contained in the topcoat composition is up to 200 parts by weight, preferably from 2 to 100 parts by weight per 100 parts by weight of the fatty acid ester. Outside this range, the topcoat layers inconveniently give rise to head clogging, head adhesion, increased jitter.

The topcoat layer according to the present invention shows improved adherence or bond to the magnetic layer and hence, improved durability since a compound having a radiation sensitive unsaturated double bond is contained therein. Irradiation of the topcoat layer composition with activating energy radiation to effect cross-linking reaction causes the topcoat layer to be quickly cured and firmly bonded to the magnetic layer, resulting in further enhanced durability. The compound contained in the topcoat layer composition also has a fluorine substituted alkyl group as exemplified by $C_nF_{2n+1}-$ wherein n is an integer from 2 to 20, which contributes to an improvement in the running stability of the medium. If n of the $C_nF_{2n+1}-$ moiety of the radiation functional compound exceeds 20, the bonding force of the topcoat layer to the magnetic layer becomes weak. Compounds having a fluorocarbon moiety wherein n is less than 2 have substantially reduced lubrication.

The topcoat layer according to the present invention, which contains a compound having both a radiation sensitive unsaturated double bond and a fluorine substituted alkyl group as exemplified by $C_nF_{2n+1}-$, exhibits a drastic improvement in running performance and is substantially free of abrasion or head clogging during operation.

The topcoat layer composition may be applied onto the magnetic layer by any desired conventional techniques, for example, gravure coating, reverse roll coating, air knife coating, and air doctor coating. It is then cured by exposure to activating energy radiation, for example, electron radiation emitted from a radiation accelerator, gamma-ray emitted from a radiation source in the form of Co60, beta-ray emitted from a radiation source in the form of Sr90, X-ray emitted from an X-ray generator, and ultraviolet radiation. The preferred source of radiation is a radiation accelerator because of ease of control of dose, matching with the production line, and shielding of ionized radiation. The preferred dose of radiation ranges from 0.1 to 20 Mrad.

In the practice of the present invention, the topcoat layer preferably has a thickness from 5 to 200 Å. Too thicker layers tend to show deteriorated electromagnetic properties and be abraded away. Too thinner layers cause head clogging. More particularly, since the magnetic layer as uncovered with a topcoat preferably has a surface roughness of up to 100 Å, too thicker topcoats on the magnetic layer are likely to be abraded. Too thinner topcoat layers are weakly adsorbed or bonded by the magnetic layer and thus likely to be separated, causing head clogging. The preferred thickness of the topcoat layer is from 10 to 100 Å.

The topcoat layer composition may further contain any desired well-known additives including lubricants, antioxidants, and hardening agents.

The topcoat composition is usually dispersed or dissolved in a suitable solvent before it is coated on the magnetic layer. The useful solvents for coating include ketones such as methyl ethyl ketone (MEK), cyclohexanone, and methyl isobutyl ketone (MIBK); alcohols such as isopropyl alcohol (IPA); aromatic hydrocarbons such as toluene; and halohydrocarbons such as dichloroethane. The solvents may be used alone or in admixture of two or more.

The lubricants used herein include well-known lubricants commonly used in magnetic recording media of the type, for example, silicone oils, fluoride oils, alcohols, fatty acids, paraffins, liquid paraffins, and various surface active agents, with the fatty acids being preferred. Some illustrative non-limiting examples of the fatty acids include fatty acids containing at least 12 carbon atoms represented by RCOOH wherein R is an alkyl group having at least 11 carbon atoms, for example, caprylic acid, capric acid, lauric acid, myristic acid, palmitic acid, stearic acid, behenic acid, oleic acid, elaidic acid, linolic acid, linoleic acid, and stearolic acid.

Silicones used may be those modified with a fatty acid and those partially modified with fluoride. Alcohols used may be higher alcohols. Fluorides used may be those prepared by electrolytic substitution, teromerization and oligomerization processes.

Among other lubricants, radiation-curable lubricants may conveniently be used. The use of such curable lubricants prevents the transfer of the morphology of the front surface to the rear surface adjoined in roll form, affording some advantages of reduced dropouts, minimized difference in output between the outside and inside coils of a roll of tape, and on-line production.

Examples of the radiation-curable lubricants include compounds containing a molecular chain capable of lubrication and an acrylic double bond in their molecule, for example, acrylates, methacrylates, vinyl acetate, acrylic acid amides, vinyl alcohol esters, methyl vinyl alcohol esters, allyl alcohol esters, glycerides, and the like. These lubricants may be represented by the following structural formulae:

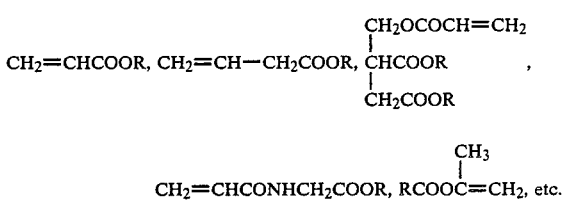

wherein R is a straight or branched, saturated or unsaturated hydrocarbon radical having at least 7 carbon atoms, preferably from 12 to 23 carbon atoms. The radicals represented by R may be fluorine substituted.

Some preferred examples of these radiation-curable lubricants include stearic acid methacrylate (acrylate), methacrylate (acrylate) of stearyl alcohol, methacrylate (acrylate) of glycerine, methacrylate (acrylate) of glycol, and methacrylate (acrylate) of silicone.

The hardening agents used herein include radiation curable monomers and oligomers. The preferred radiation curable monomers are compounds having a molecular weight of less than 2,000, and the preferred radiation curable oligomers are compounds having a molecular weight of 500 to 10,000. They include styrene, ethylacrylate, ethylene glycol diacrylate, ethylene glycol dimethacrylate, diethylene glycol acrylate, diethylene glycol dimethacrylate, 1,6-hexaneglycol diacrylate, and 1,6-hexaneglycol dimethacrylate; and more preferably N-vinylpyrrolidone, pentaerythritol tetraacrylate (and methacrylate), pentaerythritol triacrylate (and methacrylate), trimethylolpropane triacrylate, trimethylolpropane trimethacylate, polyfunctional oligoester acrylates (e.g., Aronix M-7100, M-5400, 5500, 5700, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

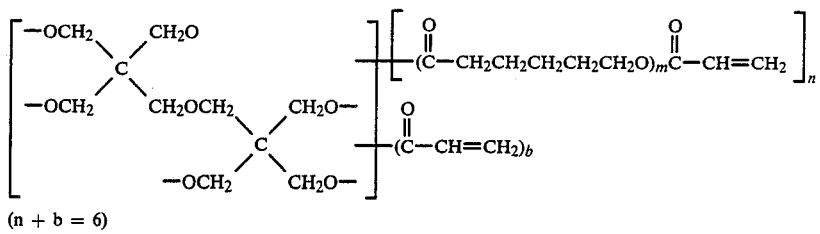

(n + b = 6)

for example, compound wherein m=1, n=2, and b=4 (to be referred to as special pentaerythritol condensate A), compound wherein m=1, n=3, and b=3 (to be referred to as special pentaerythritol condensate B), compound wherein m=1, n=6, and b=0 (to be referred to as special pentaerythritol condensate C), and compound wherein m=2, n=6, and b=0 (to be referred to as special pentaerythritol condensate D), and special acrylates represented by the following general formulae:

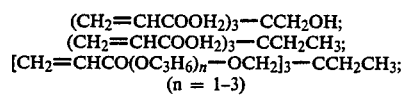

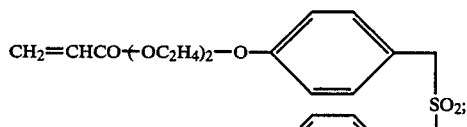

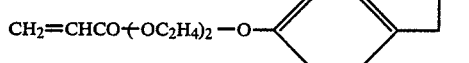

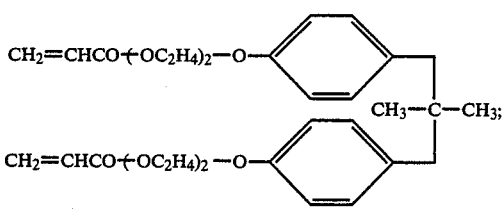

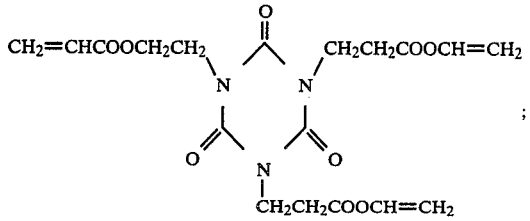

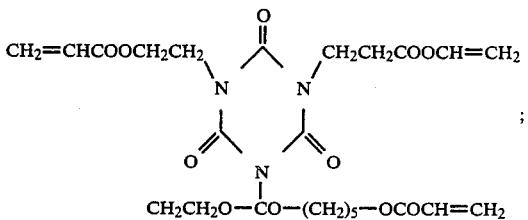

$$A-(X-Y)_{\overline{n}}X-A$$
$$(n = 1-50)$$

A: acrylic acid
X: polyhydric alcohol
Y: polybasic acid

Examples of the radiation curable oligomers include polyfunctional oligo-ester acrylates having the general formula:

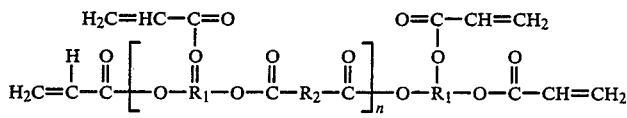

wherein $R_1$ and $R_2$ are independently selected from alkyl radicals and n is an integer, acryl modified products of urethane elastomers, and derivatives thereof having a functional group such as COOH incorporated therein.

Any anti-oxidants may be used herein as long as they can prevent oxidation of metals. The anti-oxidants used herein may be selected from conventional anti-oxidants which may be generally classified into the following groups:
(1) Phenolic anti-oxidants
(2) Amine anti-oxidants
(3) Phosphorous anti-oxidants
(4) Sulfur anti-oxidants
(5) Organic acid, alcohol and ester anti-oxidants
(6) Quinone anti-oxidants
(7) Inorganic acid and inorganic salt anti-oxidants.

Examples of each of these anti-oxidants are shown below.

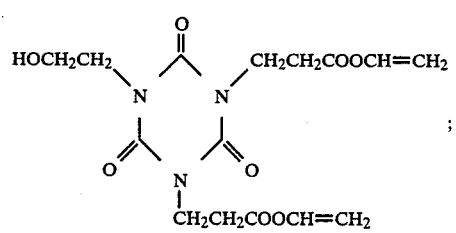

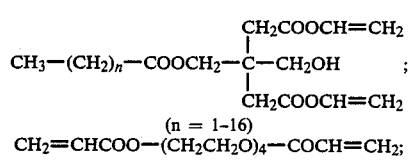

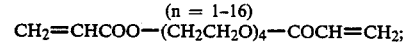

(1) Phenolic anti-oxidants 2,6-di-tert-butyl-p-cresol,
2,6-di-tert-butylphenol,
2,4-dimethyl-6-tert-butylphenol,
butylhydroxyanisole,
2,2'-methylenebis(4-methyl-6-tert-butylphenol),
4,4'-butylidenebisS(3-methyl-6-tert-butylphenol),
4,4'-thiobis(3-methyl-6-tert-butylphenol),
tetrakis[methylene-3-(3,5-di-tert-butyl-4-hydroxyphenyl)propionate]methane,
1,1,3-tris(2-methyl-4-hydroxy-5-tert-butylphenyl)butane,
dibutylhydroxytoluene,
propyl gallate,
guaiacum resin,
nordihydroguaiaretic acid, etc.

Also included are phenolic anti-oxidants of radiation curable type, for example, acrylate and methacrylate modified compounds of monoglycol salicylate, 2,5-di-tert-butylhydroquinone, 2,4-dihydroxybenzophenone, 2,4,5-trihydroxybutyrophenone, hydroquinone, etc.

(2) Amine anti-oxidants phenyl-$\beta$-naphthylamine,
$\alpha$-naphthylamine,
N,N'-di-sec-butyl-p-phenylenediamine,
phenothiazine,
N,N'-diphenyl-p-phenylenediamine,
alkanol amines,
phospholipid, etc.

Also included are amine anti-oxidants of radiation curable type, for example, dimethylaminoethyl methacrylate and acrylate.

(3) Phosphorous anti-oxidants

Included are phosphate esters of both radiation curable and radiation uncurable types. The R moiety of phosphates may include alkyl radicals, alkyl phenyl radicals, ethylene oxide, propylene oxide, etc. and preferably contain 1 to 26 carbon atoms, and most preferably 1 to 22 carbon atoms. The phosphates include mono-, di-, and tri-esters and they may be used alone or in admixture. Mixtures comprising a major proportion of mono- and di-esters are preferred and the tri-esters may be excluded.

Also included in the phosphate esters are $NH_4$ type and methacrylate and acrylate modified types.

Illustrative examples include phosphites such as triphenyl phosphite, trioctadecyl phosphite, trilauryl trithiophosphite, etc.; hexamethyl phosphoric triamide, butyl phosphate, cetyl phosphate, butoxyethyl phosphate, 2-ethylhexyl phosphate, $\beta$-chloroethyl phosphate, butoxyethyl phosphate diethylamine salt, di(2-ethylhexyl) phosphate, ethyleneglycol acid phosphate; methacrylate and acrylate phosphates such as (2-hydroxyethyl) methacrylate phosphate, butylhydroxymethacrylate phosphate, caprylhydroxylmethacrylate phosphate, myristylhydroxymethacrylate phosphate, stearylhydroxymethacrylate phosphate, cetylhydroxymethacrylate phosphate, butylphenylhydroxymethacrylate phosphate, aminophenylhydroxymethacrylate phosphate, nonylphenylhydroxymethacrylate phosphate, and similar acrylate phosphates; phenyl phosphates such as phenyl phosphate and nonyl phosphate; alcoholic phosphates; vanadium series acidic phosphates, and the like.

The phosphate esters may be prepared by any well-known methods, for example, as disclosed in Japanese Patent Publication No. 57-44223.

(4) Sulfur anti-oxidants dilaurylthiiodipropionate,
distearylthiodipropionate,
laurylstearylthiodipropionate,
dimyristylthiodipropionate,
distearyl-$\beta,\beta'$-thiobutyrate,
2-mercaptobenzoimidazole,
dilaurylsulfide, etc.

Also included are radiation curable methacrylate and acrylate modified compounds of 4,4'-thio-bis(3-methyl-6-tert-butylphenol),
2,2'-thio-bis(4-methyl-6-tert-bytylphenol), etc. They may further contain ethylene oxide and propylene oxide units.

(5) Organic acid, alcohol, and ester anti-oxidants

Included are sorbitol, glycerine, propylene glycol, adipic acid, citric acid, ascorbic acid, etc. as well as radiation curable derivatives thereof.

(6) Quinone anti-oxidants

Included are hydroquinone, tocopherol, etc. as well as radiation curable derivatives thereof.

(7) Inorganic acid and inorganic salt anti-oxidants

Phosphoric acid is a typical example.

In order to minimize the transfer of the topcoat substance to the back surface of the magnetic recording medium in a roll form, radiation curable anti-oxidants having an acrylic double bond in their molecule are preferred, for example, monoglycol salicylate methacylate and acrylate, 4-tert-butylcatechol methacrylate and acrylate, dimethylaminoethyl methacrylate and acrylate, ethylhydroxymethacrylate and acrylate phosphates, cetylhydroxyphosphate methacrylate and acrylate, stearyl methacrylate and acrylate phosphates, and phenyl derivatives of the foregoings, 2,2'-thio-bis(4-methyl-6-tert-butylphenol) methacrylate and acrylate, etc.

The radiation curable anti-oxidants can be on-line cured to the ferromagnetic thin film during manufacturing, eliminating the deterioration of surface properties or output reduction due to subsequent heat curing which makes a roll tighter to cause the conformity of the topcoat layer to the surface morphology of the back side.

When the lubricants, antioxidants, and hardening agents are added to the topcoat composition, it is desired that their total amount added is up to 10 folds of the total weight of the compound or compounds containing a group having a radiation sensitive unsaturated double bond and a group having a fluorine substituted alkyl group as represented by formulae (I) and (II). It is also desired that the amount of antioxidant added be not more than the total weight of lubricant and hardening agent.

It is not necessarily required to form a backcoat layer on the opposite major surface of a substrate having the magnetic layer and the topcoat layer on one major surface thereof. The provision of a backcoat layer, however, further stabilizes runnability. The backcoat layer may be formed from any desired compositions comprising commonly employed ingredients such as inorganic pigments, lubricants, and organic binders.

The magnetic recording medium according to the present invention exhibits good properties of running stability, durability, dropout prevention, and rust prevention under varying environments because the topcoat layer has a composition comprising a fatty acid ester having a melting point of from −20° C. to 30° C. and a compound containing a group having a radiation sensitive unsaturated double bond and a group having a fluorine substituted alkyl group.

EXAMPLES

In order that those skilled in the art will better understand the practice of the present invention, examples of the invention are given below by way of illustration and not by way of limitation.

EXAMPLES 1–12

Formation of Magnetic Layer

A polyester base film of 12 μm thick was moved along the circumference of a cooling cylindrical can in a vacuum chamber which was evacuated to a vacuum of $1.0 \times 10^{-4}$ Torr and through which a mixture of $O_2 + Ar$ (volume ratio 1:1) was passed at a flow rate of 800 ml/min. The polyester film was metallized by an established oblique evaporation technique wherein an Co80Ni20 alloy was melted and evaporated in the chamber and the resulting vapor was directed to and deposited on the polyester film at an incident angle of 90° to 30°. There was formed a Co-Ni-O thin film having a thickness of 0.15 μm. It was found that oxygen was rich at both the interface of the metallized film with the base film and the surface of the metallized film remote from the base film. The surface of the metallized film remote from the base film was substantially solely covered with oxides. The average oxygen content in the metallized film was 40% as expressed in atomic ratio to cobalt and nickel, $O/(Co+Ni) \times 100\%$. The metallized film was measured to have a coercive force Hc of 1000 Oe.

Formation of Topcoat Layer

Topcoat layers were formed by applying the following compositions on the magnetic layer. The fatty acid esters and the compounds used are designated by E-numbers and F-numbers previously listed as illustrative examples thereof. MEK and MIBK are abbreviations of methyl ethyl ketone and methyl isobutyl ketone, respectively.

| Composition 1 | |
|---|---|
| Ingredients | Parts by weight |
| E-26 (mp = 9.0° C.) | 0.5 |
| F-2 | 0.3 |
| MEK | 30 |
| Cyclohexanone | 70 |

The ingredients were mixed for one hour at room temperature. The resulting mixture was gravure coated onto the magnetic layer to a uniform thickness, dried at 100° C. for one minute, and then exposed to electron radiation in a nitrogen atmosphere under conditions of 150 keV, 6 mA, and 3 Mrad, obtaining a topcoat layer of 25 Å thick.

| Composition 2 | |
|---|---|
| Ingredients | Parts by weight |
| E-24 (mp = 27.5° C.) | 0.2 |
| F-1 | 0.2 |
| Aronix M7100 ® | 0.2 |
| Toluene | 100 |

A topcoat layer was formed from Composition 2 by following the procedure described for Composition 1.

| Composition 3 | |
|---|---|
| Ingredients | Parts by weight |
| E-18 (mp = 1.0° C.) | 0.8 |
| F-8 | 0.2 |
| MIBK | 80 |
| Toluene | 20 |

A topcoat layer was formed from Composition 3 by following the procedure described for Composition 1.

| Composition 4 | |
|---|---|
| Ingredients | Parts by weight |
| E-20 (mp = 18.3° C.) | 0.4 |
| F-3 | 0.3 |
| Stearyl acrylate | 0.2 |
| Cyclohexanone | 100 |

A topcoat layer was formed from Composition 4 by following the procedure described for Composition 1.

| Composition 5 | |
|---|---|
| Ingredients | Parts by weight |
| E-26 (mp = 9.0° C.) | 0.5 |
| F-4 | 0.3 |
| Pentaerythritol triacrylate | 0.3 |
| MIBK | 50 |
| MEK | 50 |

A topcoate layer was formed from Composition 5 by following the procedure descrubed for Composition 1.

Compositions 6–11 described below are outside the scope of the present invention and presented for comparison purposes.

| Composition 6 | |
|---|---|
| Ingredients | Parts by weight |
| F-3 | 0.2 |
| MEK | 40 |
| MIBK | 60 |

A topcoate layer was formed from Composition 6 by following the procedure described for Composition 1.

| Composition 7 | |
|---|---|
| Ingredients | Parts by weight |
| E-21 (mp = 19.4° C.) | 0.8 |
| Cyclohexanone | 10 |
| Toluene | 90 |

A topcoat layer was formed from Composition 7 by following the procedure described for Composition 1 except that electron radiation exposure was omitted.

| Composition 8 | |
| --- | --- |
| Ingredients | Parts by weight |
| E-20 (mp = 18.3° C.) | 0.4 |
| F-3 | 1.0 |
| Toluene | 50 |
| MIBK | 50 |

A topcoat layer was formed from Composition 8 by following the procedure described for Composition 1.

| Composition 9 | |
| --- | --- |
| Ingredients | Parts by weight |
| E-24 (mp = 27.3° C.) | 0.5 |
| $C_8F_{17}$—$C_2H_4$—COOH | 0.3 |
| MEK | 100 |

A topcoat layer was formed from Composition 9 by following the procedure described for Composition 1.

| Composition 10 | |
| --- | --- |
| Ingredients | Parts by weight |
| Stearic acid (mp = 39.1° C.) | 0.4 |
| F-2 | 0.4 |
| Toluene | 40 |
| MIBK | 60 |

A topcoat layer was formed from Composition 10 by following the procedure described for Composition 1.

| Composition 11 | |
| --- | --- |
| Ingredients | Parts by weight |
| Methyl caprylate (mp = −34.0° C.) | 0.4 |
| F-3 | 0.4 |
| Toluene | 40 |
| MIBK | 60 |

A topcoat layer was formed from Composition 11 by following the procedure described for Composition 1.

The thus prepared samples of magnetic recording medium were processed in standard video tape size and determined for still life, magnetic side friction, output, rust occurrence, envelope, repeated pass, head clogging, and topcoat abrasion.

The test methods for measuring these properties are described below.

Still life

Signals were recorded at 5 MHz and then reproduced in a still mode to determine the still life of a reproduced image until it faded to an unacceptable level. A still life of 10 minutes or longer is evaluated "pass".

Magnetic side friction

A magnetic tape sample was wound around a cylinder with its magnetic side in direct contact with the cylinder. While a load of 20 grams was applied to one end of the tape, the cylinder was rotated 90° to determine a change of tension, from which an initial coefficient of friction was calculated.

Measurement was done under three different conditions: 0° C. and RH 40%, 20° C. and RH 60%, and 40° C. and RH 80%. The results are expressed by the following symbols.

| Symbols | Coefficient of friction |
| --- | --- |
| O | 0.2 (inclusive) to 0.3 (exclusive) |
| Δ | 0.3 (inclusive) to 0.4 (exclusive) |
| X | 0.4 (inclusive) to 0.5 (exclusive) |

Output

The output of recorded samples was measured at a central frequency of 5 MHz. The results are expressed as relative output provided that the output of sample No. 1 is 0 dB.

Rust

Samples were held for 7 days in an environment at 50° C. and relative humidity 80% and thereafter examined whether or not rust occurred.

Envelope, Head clogging, & Repeated passes

These properties were measured using a commercial VHS video deck type AG2200 manufactured by Matsushita Electric K.K.

The repeated pass test was done under three different conditions: 0° C. and RH 40%, 20° C. and RH 60%, and 40° C. and RH 80%. The results are expressed by the following symbols.

| Symbols | Pass and adhesion |
| --- | --- |
| O | no adhesion over 100 passes |
| Δ | adhered intermediate 50 and 100 passes |
| X | adhered within less than 50 passes |

Topcoat abrasion

The samples which had subjected to the repeated pass test were examined under an optical microscope with a magnifying power of 400× whether or not the samples were abraded.

The results are shown in Table 1. The data clearly show that the topcoat layer of the present invention offers very advantageous physical and electromagnetic properties.

TABLE 1

| Sample No. | Topcoat composition | Still life (min.) | Rust | Output (dB) | Envelope | Repeated pass @ 0° C. | @ 20° C. | @ 40° C. | Head clogging | Topcoat abrasion | Initial friction of magnetic layer @ 0° C. | @ 20° C. | @ 40° C. |
| --- | --- | --- | --- | --- | --- | --- | --- | --- | --- | --- | --- | --- | --- |
| 1 | 1 | >30 | No | 0.0 | Unchanged | O | O | O | No | No | O | O | O |
| 2 | 2 | >30 | No | 0.0 | Unchanged | O | O | O | No | No | O | O | O |
| 3 | 3 | >30 | No | −0.5 | Unchanged | O | O | O | No | No | O | O | O |
| 4 | 4 | >30 | No | +0.3 | Unchanged | O | O | O | No | No | O | O | O |
| 5 | 5 | >30 | No | +0.5 | Unchanged | O | O | O | No | No | O | O | O |
| 6* | 6 | 5 | No | −0.5 | Changed | X | Δ | Δ | No | No | Δ | Δ | O |
| 7* | 7 | >30 | Some | −2.0 | Changed | Δ | O | Δ | Clog | Abraded | O | O | Δ |
| 8* | 8 | 10 | No | −0.5 | Unchanged | Δ | Δ | O | No | No | O | Δ | O |

TABLE 1-continued

| Sample No. | Topcoat composition | Still life (min.) | Rust | Output (dB) | Envelope | Repeated pass @ 0° C. | @ 20° C. | @40° C. | Head clogging | Topcoat abrasion | Initial friction of magnetic layer @ 0° C. | @20° C. | @40° C. |
|---|---|---|---|---|---|---|---|---|---|---|---|---|---|
| 9* | 9 | >30 | Rust | 0.0 | Changed | Δ | O | O | No | Abraded | O | O | Δ |
| 10* | 10 | >30 | No | +0.5 | Unchanged | X | Δ | O | No | No | X | O | O |
| 11* | 11 | >30 | No | +1.0 | Unchanged | O | Δ | X | No | No | O | X | X |
| 12* | — | 5 | Rust | −0.2 | Greatly Changed | X | X | Δ | No | — | X | X | X |

*comparison

We claim:

1. A magnetic recording medium comprising a nonmagnetic substrate, a ferromagnetic metal thin film magnetic layer on the substrate, and a topcoat layer on the magnetic layer, wherein said topcoat layer is 5 to 200 Å thick and has a composition consisting essentially of 100 parts by weight of a fatty acid ester having a melting point of from −20° C. to 30° C. and an effective amount up to 200 parts by weight of a compound selected from compounds having the general formulae (I) and (II):

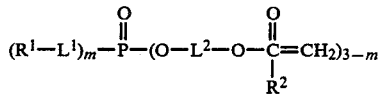

and

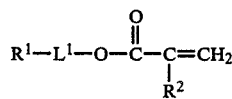

wherein $R^1$ is a fluorine substituted alkyl group of the formula $C_nF_{2n+1}$ wherein n has a value of 2 to 20, $R^2$ is hydrogrogen atom or a $C_1-C_3$ alkyl group, $L^1$ and $L^2$ are divalent bridging groups independently selected from substituted or unsubstituted $C_1-C_4$ alkylene groups, and m is equal to 1 or 2.

2. The magnetic recording medium of claim 1, wherein said compound has the general formula (I).

3. The magnetic recording medium of claim 1, wherein said compound has the general formula (II).

4. The magnetic recording medium of claim 1 wherein 2 to 100 parts by weight of said compound is present per 100 parts by weight of said fatty acid ester.

5. The magnetic recording medium of claim 1 wherein the topcoat layer composition further comprises an antioxidant, a lubricant, or a hardening agent or a mixture thereof in admixture with said fatty acid ester and said compound.

6. The magnetic recording medium of claim 5 wherein said lubricant is radiation curable.

7. The magnetic recording medium of claim 5 wherein said hardening agent is a radiation curable monomer or oligomer.

8. The magnetic recording medium of claim 5 wherein said antioxidant, said lubricant, and said hardening agent are present in a total weight of up to 10 folds of the total weight of said compound.

* * * * *

UNITED STATES PATENT AND TRADEMARK OFFICE
CERTIFICATE OF CORRECTION

PATENT NO. : 4,758,471
DATED : July 19, 1988
INVENTOR(S) : HIROYUKI ARIOKA ET AL It is certified that error appears in the above-identified patent and that said Letters Patent is hereby corrected as shown below:

Claim 1, line 9, after "weight" insert:

--based upon 100 parts by weight of said fatty acid ester--.

Signed and Sealed this

Twenty-seventh Day of December, 1988

Attest:

DONALD J. QUIGG

*Attesting Officer*      *Commissioner of Patents and Trademarks*